(12) United States Patent
Kazeoka et al.

(10) Patent No.: US 8,551,281 B2
(45) Date of Patent: Oct. 8, 2013

(54) LAMINATED METAL SHEET AND METHOD OF PRODUCTION OF SAME

(75) Inventors: Hayato Kazeoka, Tokai (JP); Sotoji Ohsasa, Tokai (JP); Akihiro Murata, Tokai (JP); Tadaaki Ochiai, Tokai (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 525 days.

(21) Appl. No.: 12/317,201

(22) Filed: Dec. 18, 2008

(65) Prior Publication Data

US 2009/0133830 A1    May 28, 2009

Related U.S. Application Data (63) Continuation of application No. 10/568,652, filed as application No. PCT/JP03/14945 on Nov. 21, 2003, now abandoned.

(30) Foreign Application Priority Data

Aug. 18, 2003 (JP) .................................. 2003-207664
Oct. 2, 2003 (JP) .................................. 2003-343969

(51) Int. Cl.
   *B29C 65/44* (2006.01)
   *B32B 37/04* (2006.01)
(52) U.S. Cl.
   USPC .......................... 156/309.6; 156/322; 156/324
(58) Field of Classification Search
   USPC ............ 156/244.11, 308.2, 309.3, 309.9, 322, 156/324, 555
   See application file for complete search history.

(56) References Cited

U.S. PATENT DOCUMENTS

| | | | |
|---|---|---|---|
| 5,093,208 A | * | 3/1992 | Heyes et al. .................. 428/623 |
| 5,234,516 A | | 8/1993 | Okamura et al. |
| 6,200,409 B1 | * | 3/2001 | Tanaka et al. ............... 156/309.9 |
| 6,217,991 B1 | * | 4/2001 | Tanaka et al. ................. 428/212 |

FOREIGN PATENT DOCUMENTS

| | | |
|---|---|---|
| EP | 0312308 | * 10/1988 |
| EP | 0 796 721 | 9/1997 |
| EP | 1 086 808 | 3/2001 |
| JP | 63-231926 | 9/1988 |
| JP | 02-501644 | 6/1990 |
| JP | 5-200961 | 8/1993 |
| JP | 2002-120324 | 4/2002 |
| WO | 89/03302 | 4/1989 |
| WO | WO 89/03302 | 4/1989 |
| WO | WO 94/21457 | 9/1994 |

* cited by examiner

*Primary Examiner* — Katarzyna Wyrozebski Lee
*Assistant Examiner* — Scott W Dodds
(74) *Attorney, Agent, or Firm* — Kenyon & Kenyon LLP (57) ABSTRACT

When laminating two types of film (1, 2) with different melting points on the two sides of a metal sheet (3), the thickness of the low melting point side film (2) is adjusted. Specifically, the thickness d2 of the low melting point side film (2) at the part sandwiched between the lamination roll (10) and metal sheet (3) is made a range defined by $d2 \geq k(\Delta MP - \Delta T)/V$. Here, $\Delta MP$ is the difference of melting points of the two types of film, k is $k \geq 2$, $0 < \Delta T = MP1 - \Phi Ti \leq 50 (°C.)$ (Ti is the metal sheet temperature at the inlet side of the rolls, V is the sheet running speed, $\Phi$ is a constant determined by the heat removal conditions at the time of lamination, where $0.75 \leq \Phi < 1$). Due to this, sticking of the low melting point side film (2) to the lamination roll (10) can be prevented.

3 Claims, 7 Drawing Sheets

LAMINATED METAL SHEET AND METHOD OF PRODUCTION OF SAME

This application is a continuation application under 35 U.S.C. §120 of prior application Ser. No. 10/568,652 filed Feb. 15, 2006 now abandoned which is a 35 U.S.C. §371 of International Application No. PCT/JP2003/14945 filed Nov. 21, 2003, wherein PCT/JP2003/14945 was filed and published in the Japanese language.

TECHNICAL FIELD

The present invention relates to a laminated metal sheet used as a material for food cans and other containers and comprised of a metal sheet laminated on the front and back with two types of resins with different melting points and a method of production of the same.

BACKGROUND ART

As materials for food cans, beverage cans, aerosol cans, and other containers, metal sheets covered on their surfaces with a polyester, polyolefin, or other thermoplastic resin are being made much use of. In this case, the metal sheet used is generally steel sheet or aluminum sheet. Among these, for example, polyester-based resins are generally superior in corrosion resistance, flaw resistance, and printability and can be used for both the inner surface and outer surface of cans in some cases, but when the content is alkaline, the resin is insufficient in durability. Further, when used for meat-based food cans, there is the problem that the meat releasability is poor. To solve this problem, two-sided laminated metal sheets covered with different types of resin at the can inside surface side and the can outer surface side are being used.

In general, as the can outer surface side film, a relatively hard polyester-based resin film is preferably used, while as the can inside surface side film, a lower melting point, excellent meat releasability and alkali durability, relatively soft polyolefin-based resin film is preferably used. Metal sheet laminated with different films on its two surfaces is disclosed in Japanese Patent Publication (A) No. 63-231926, Japanese National Publication (A) No. 2-501644, and Japanese Patent Publication (A) No. 2002-120324. Note that the terms "high melting point film" and "low melting point film" used in the present description do not mean films with melting points of absolute values. A relatively high melting point side film is called a "high melting point film", while a relatively low melting point side film is called a "low melting point film".

In general, a laminated metal sheet is produced by the method of superposing a heated metal sheet and resin films and using lamination rolls to apply pressure to bond them (heat lamination method). To make them bond, the temperature of a film surface contacting the metal sheet has to be at least its melting start point Tsm (normally a temperature about 0 to 30° C. lower than the melting point), more preferably at least the melting point MP, but on the other hand if the temperature of a film surface contacting a lamination roll becomes the melting start point or more, the film will stick to the lamination roll making production impossible.

For this reason, the temperature of the metal sheet at the lamination part has to be strictly controlled in relation with the film melting points, but when using a polyester-based resin film as the high melting point film and using a polyolefin-based resin film as the low melting point film, since the melting points MP of the two greatly differ (for example, polyethylene terephthalate (polyester-based) has a melting point of 265° C., while polypropylene (polyolefin-based) has one of 168° C.), there is the problem that if setting the temperature of the metal sheet to match with one of the films, the other film will not bond well.

Therefore, as shown in Japanese Patent Publication (A) No. 63-231926, the method of first laminating the high melting point resin film, then laminating the low melting point resin film in a later step where the temperature of the metal sheet falls, that is, a two-step lamination method, and, as shown in Japan National Publication (A) No. 2-501644, the method of reheating after the lamination step by the press-bonding of the lamination rolls so as to melt-bond the resins have been proposed, but both of these have the problems of swelling capital costs. Further, Japanese Patent Publication (A) No. 2002-120324 proposes a simultaneous lamination method matching the temperature of the metal sheet with the low melting point resin film, but it is believed that a low melting point resin for bonding purposes is required at the metal sheet side of the high melting point resin film, so again the cost rises.

Further, in the prior art disclosed in Japanese Patent Publication (A) No. 63-231926 and Japanese Patent Publication (A) No. 2002-120324, since the low melting point resin film is kept from melt-bonding with the lamination roll by setting the temperature of the metal sheet to match with the low melting point resin film, the crystallization degree will not be lowered to an extent enabling the laminated low melting point resin film to be sufficiently worked. For this reason, when bending a two-sided laminated metal sheet to work it to a food can etc., the phenomenon of the worked part of the low melting point film whitening appears. It looks like the can contains foreign matter. Therefore, users and can makers would be liable to raise complaints.

DISCLOSURE OF THE INVENTION

The present invention solves the above problems of the prior art and provides a laminated metal sheet enabling simultaneous lamination of two types of film with different melting points, without sticking on the lamination rolls, on the two surfaces of a metal sheet and a method of production of the same. Further, the present invention provides more inexpensively a two-sided laminated metal sheet free from the low melting point resin film whitening even when working the sheet to produce a food can etc. The present invention has as its gist the following.

(1) A laminated metal sheet obtained by laminating two types of film including a high melting point film and low melting point film on the two sides of a metal sheet, said laminated metal sheet characterized by having a low melting point film thickness d2 defined by the following equation 1:

$$d2(\mu m) \geq k(\Delta MP - \Delta T)/V$$

where, $\Delta MP = MP1 - MP2$
MP1: melting point of high melting point film (° C.)
MP2: melting point of low melting point film (° C.)
k: constant determined by low melting point Film's heat conductivity, heat capacity, and temperature, $k \geq 2$ [$\mu m \cdot m/(° C. \cdot s)$]

$$0 < \Delta T = MP1 - \Phi \cdot Ti \leq 50 (° C.)$$

Ti: metal sheet temperature at lamination roll inlet side (° C.)
Φ: constant determined by heat removal conditions at time of lamination ($0.75 \leq \Phi < 1$)
V: sheet running speed (m/s)

(2) A laminated metal sheet as set forth in (1), characterized in that said high melting point film is comprised of a polyester-based resin and said low melting point film is comprised of a polyolefin-based resin.

(3) A laminated metal sheet as set forth in (2), characterized in that said polyester-based resin is selected from polyethylene terephthalate, a polyethylene terephthalate/isophthalate copolymer, polyethylene naphthalate, a polyethylene terephthalate/naphthalate copolymer, a mixed resin of polybutylene terephthalate and polyethylene terephthalate, a mixed resin of polybutylene terephthalate and a polyethylene terephthalate/isophthalate copolymer, and further one of these resins including a pigment or dye.

(4) A laminated metal sheet as set forth in (2), characterized in that said olefin-based resin is selected from a polypropylene, polyethylene, a polypropylene/polyethylene random copolymer, or these resins including a pigment or dye.

(5) A laminated metal sheet as set forth in (1), characterized in that a difference ΔHz between a haze value Hz2 of a low melting point film after bending a sheet of a thickness of 1 mm by 180 degrees across said high melting point film side and a haze value Hz1 of the low melting point film before bending is made not more than 20%.

(6) A laminated metal sheet as set forth in (5), characterized in that the haze value Hz1 of the low melting point film before bending is made not more than 60%.

(7) A laminated metal sheet as set forth in (1) or (2), characterized by using for said high melting point film a biaxially stretched polyester-based resin film and leaving crystal orientation at that surface layer.

(8) A laminated metal sheet as set forth in (1), characterized in that, among the two types of film including said high melting point film and low melting point film, when the melting points inside the films differ according to the position in the thickness direction, the lower surface melting point of the one film at the side contacting the roll is designated as MP2 and the film melting point of the other film at the metal sheet side is designated as MP1 for calculation and lamination.

(9) A laminated metal sheet as set forth in (8), characterized in that the sheet running speed V defined in (1) is made 1 to 3.5 m/s for lamination.

BEST MODE FOR WORKING THE INVENTION

Figure 1:
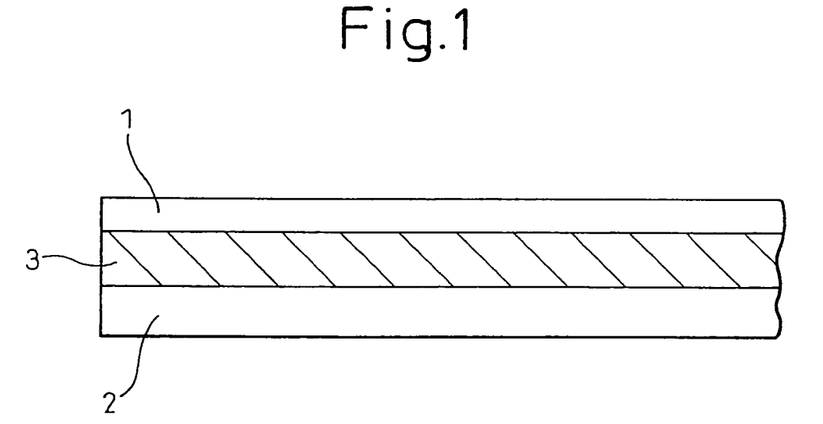
FIG. 1 is an enlarged sectional view of a two-sided laminated metal sheet of the present invention.

FIG. 1 is an enlarged sectional view of a two-sided laminated metal sheet of the present invention, wherein 3 indicates a steel sheet, aluminum sheet, or other metal sheet, 1 a high melting point film laminated at one side of this metal sheet 3, and 2 a low melting point film laminated at the other side of this metal sheet 3.

Figure 2:
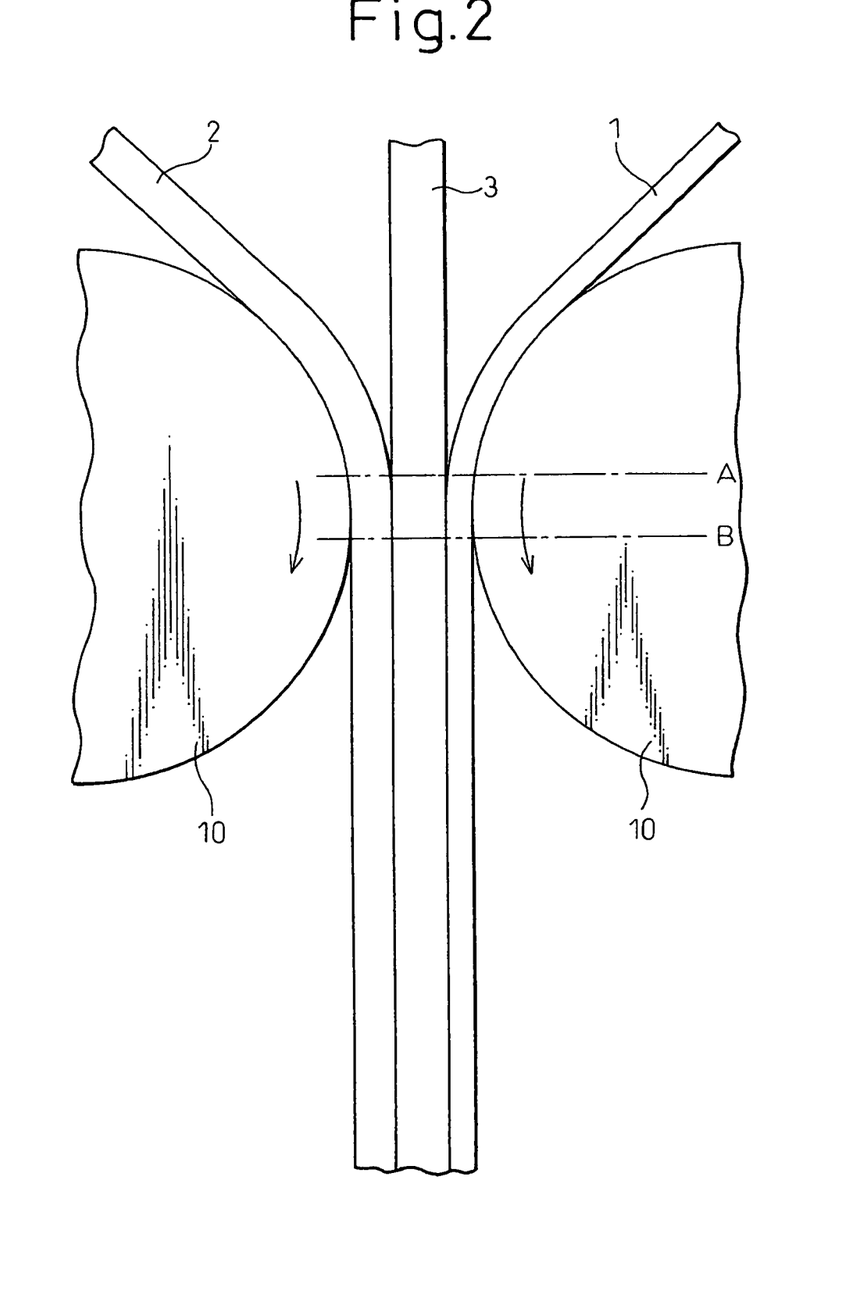
FIG. 2 is an explanatory view of a process of production of a two-sided laminated metal sheet.

FIG. 2 is an explanatory view of a process of production of a two-sided laminated metal sheet according to the present invention. In FIG. 2, 10 indicates a pair of left and right lamination rolls. A high melting point side film 1 and a low melting point side film 2 are superposed over the two sides of the metal sheet 3 and press bonded by the lamination rolls 10. The metal sheet 3 is for example a steel sheet. In the case of use as a material for a container, the metal sheet 3 has a thickness of 0.1 to 0.5 mm or so in usual cases. The high melting point side film 1 is, for example, a relatively hard, superior printability, flaw resistance, retort bondability, etc. polyester-based resin, while the low melting point side film 2 is, for example, a superior corrosion resistance, workability, meat releasability, retort bondability, etc. polyolefin-based resin. Note that A indicates a point immediately before the metal sheet 3 and films contact, while B indicates a point immediately before the films separate from the lamination rolls 10.

In the present invention, the metal sheet 3 is heated in advance to a temperature at least the melting start point of the high melting point side film 1, preferably the melting point+50° C. or less, for example, 270° C. As a result, both the film 1 and the film 2 are raised in temperature at the sides contacting the metal sheet 3 to at least the melting start points and bond with the metal sheet 3. At this time, both the films 1 and 2 rise in temperature at the opposite sides (sides contacting the lamination rolls 10) due to conduction of heat from the metal sheet 3, but the film 1 can generally be bonded under conditions where the roll exit side metal sheet temperature Td (=Φ·Ti, Φ being a constant determined by the heat removal conditions at the time of lamination, 0.75≤Φ<1) is less than the melting start point of the film 1, so under those conditions, will not stick to the lamination roll 10.

Figure 3:
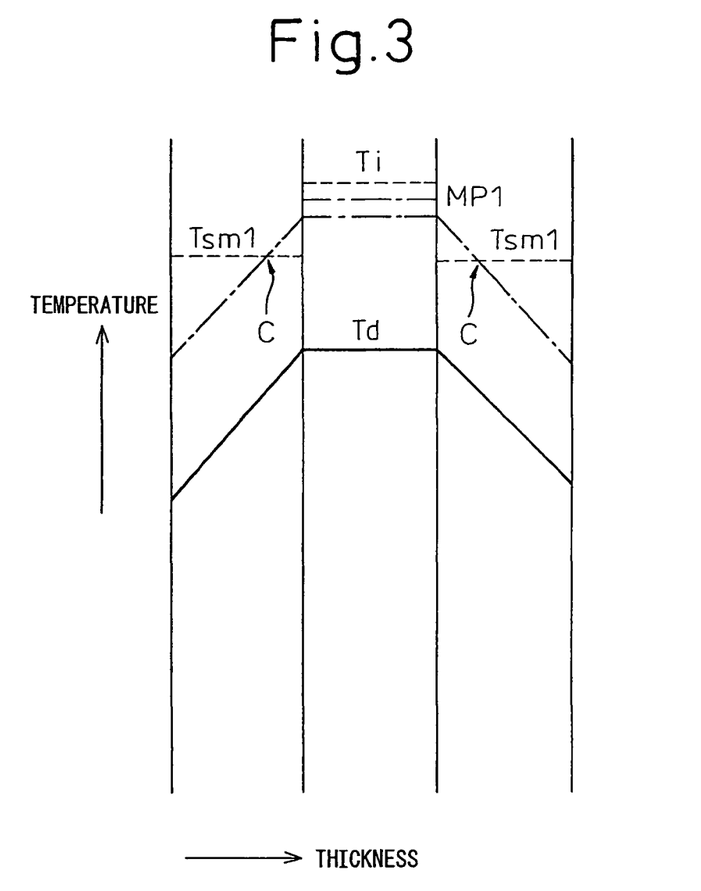
FIG. 3 is a view of the temperature profiles immediately before the rolls separate from the films in the case of laminating same melting point films on the two sides of a metal sheet.

FIG. 3 schematically shows, for explanatory purposes, the temperature profiles inside the metal sheet and films immediately before the rolls separate from the films in the case where the same melting point films are bonded to the two sides of the metal sheet 3. The temperature of the metal sheet Ti at the point A immediately before the metal sheet and the films are brought into contact by the rolls becomes higher than the melting start point Tsm1 of the films, but the temperature of the metal sheet Td (=Φ·Ti) at the point B immediately before the rolls separate from the films usually becomes lower than the melting start point Tsm1 of the films. Therefore, the temperatures of the film surfaces at this point of time become lower than the melting start point Tsm1 of the films and the films will not stick to the rolls 10.

Usually, each film has at thickness determined by the reason that for example the lower limit of film formation is 10 μm or that for corrosion resistance to be maintained, 20 μm or more is necessary. By selecting the lamination conditions in accordance with the determined thickness, it is possible to avoid sticking. The conditions under which a film will not stick to a roll are conditions where, while the roll and film are in contact, the temperature at the point C of the film thickness position is less than the melting start point Tsm1. This can be achieved by selecting the lamination conditions. Specifically, when laminating two types of film with different melting points on a metal sheet, if considering corrosion resistance in food can applications, the high melting point side film generally has a thickness of 20 to 30 μm or so, but greater thicknesses can be obtained for other applications.

Further, the temperature of the metal sheet when contacting the films normally becomes higher than the melting start point Tsm1 of the films, but at the point of time when the rolls separate from the films, as shown in FIG. 3, it becomes lower than the melting start point Tsm1 of the films. This is because heat is removed through the film to the roll side. If considering the fact that the temperature (Ti) at the point A immediately before the metal sheet and films contact is higher than the melting start point Tsm1 of the films, by experience, as shown in equation 1, $0 < MP1-Td=MP1-\Phi \cdot Ti \leq 50$ (° C.) becomes required as a condition. That is, if $MP1-\Phi \cdot Ti$ becomes 50° C. or more, Ti becomes Tsm1 or less and bonding is sometimes not sufficient. This condition becomes a required condition of the roll inlet side temperature for bonding the high melting point film to a metal sheet when laminating two types of film with different melting points. Note that $\Phi$ is determined by the heat removal conditions at the time of lamination and specifically is determined by adjusting the lamination rolls in surface temperature or pressing force. $\Phi < 1$. In general, $0.75 \leq \Phi < 1$ can be adjusted to.

Further, the higher the temperature Ti at which the metal sheet and films are bonded, the better the bondability of the metal sheet and the high melting point film. If raising Ti, Td $(=\Phi \cdot Ti)$ also becomes higher, so to further raise the bondability, by experience, it is sufficient to set Ti about 10° C. higher than the bonding lower limit temperature. This can generally be achieved if $0 < MP1-\Phi \cdot Ti \leq 40$ or so. By raising the film bondability, the film peeling strength, corrosion resistance, retort bondability, etc. can be improved.

When laminating the high melting point film 1 and low melting point film 2, if applying lamination conditions commensurate with the melting point of the film 1 without considering the film thickness, due to the heat conduction from the metal sheet 3, the temperature of the film 2 at the side contacting the lamination roll 10 will exceed the melting start point of the film 2 and the film will end up sticking to the lamination roll 10 in some cases. However, in the present invention, the low melting point side film is adjusted in thickness d2 to specifically make $d2 \geq k (\Delta MP-\Delta T)/V$ and thereby solve this problem. Here, $\Delta MP=MP1-MP2$, where MP1 is the melting point (° C.) of the high melting point film, MP2 is the melting point (° C.) of the low melting point film, and V is the sheet running speed (m/s). Further, $\Delta T=MP1-\Phi \cdot Ti$.

Here, k is a coefficient expressed by equation 2 according to the Law of Heat Conduction:

$$k = \frac{\lambda_2 L}{Cp_2 \cdot \alpha}$$

Figure 4:
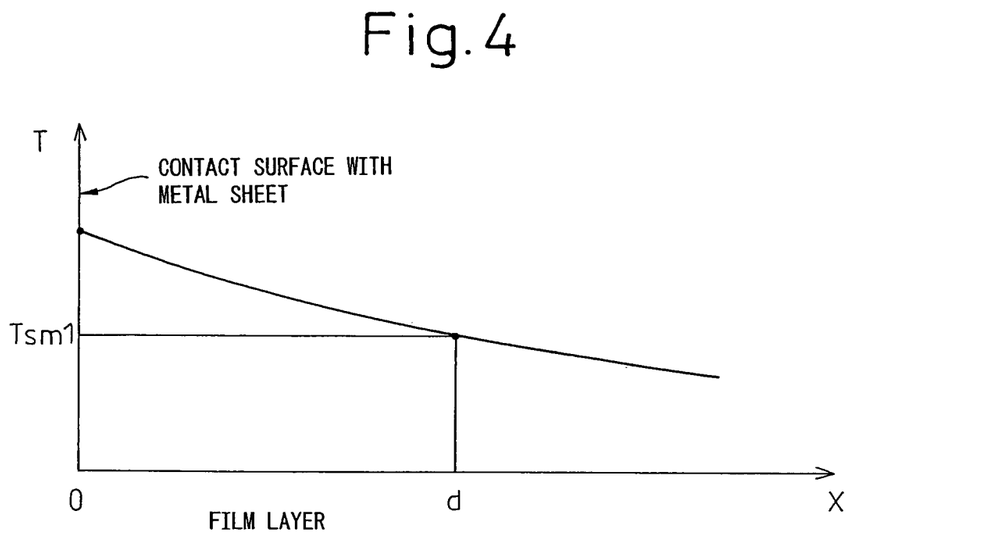
FIG. 4 is a graph of a heat conduction analysis model.

Below, the content of equation 2 will be explained. First, as shown in FIG. 4, a one-dimensional heat conduction analysis model of the inside of a film having an abscissa x indicating the film thickness and an ordinate indicating the temperature T is prepared. The temperature when $x=0$ is the temperature of the metal sheet at a certain time t. Further, if the temperature of the side of the film contacting the roll is less than the melting start point Tsm1, it is assumed that the film will not stick to the roll. The distance d not sticking to the roll becomes the necessary film thickness.

Figure 5:
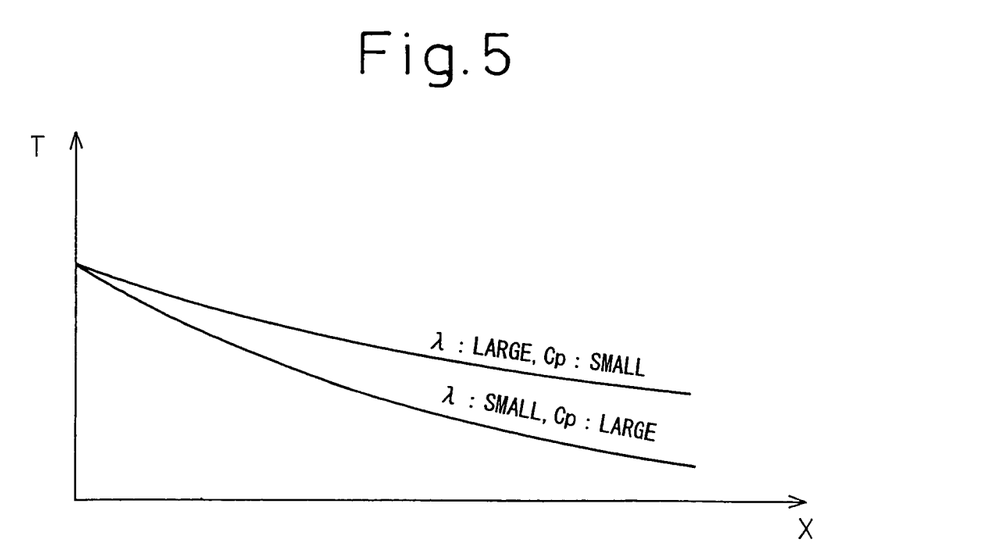
FIG. 5 is a graph of temperature gradients inside the two types of film.
Figure 6:
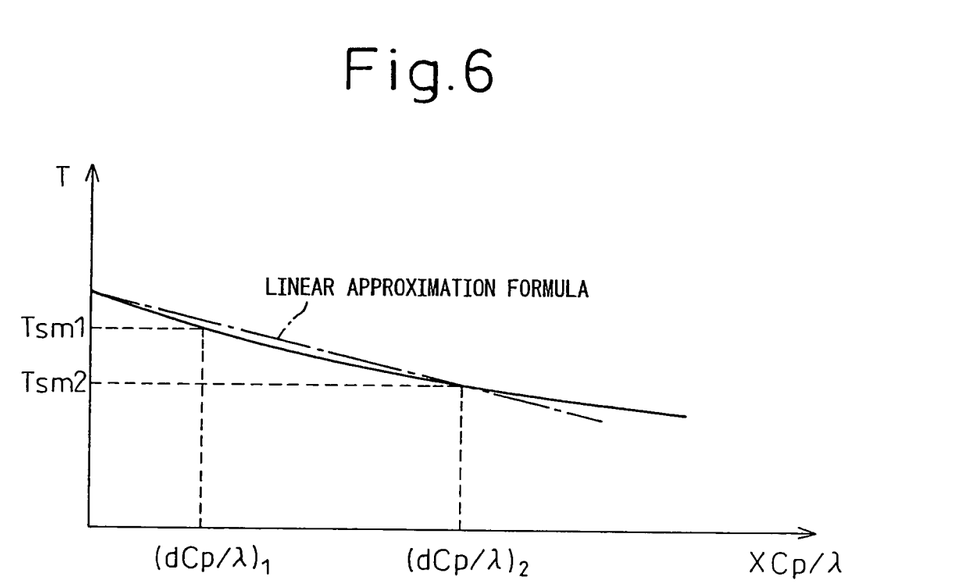
FIG. 6 is a graph of a method for finding a thickness by which a film will not stick to the rolls.

In the present invention, two types of film are laminated on the metal sheet, so, as shown in FIG. 5, two curves are shown, but the heat conductivities $\lambda$ and the specific heat CP do not greatly differ (seldom differ by an order of magnitude), so the distance x is divided by $\lambda$ and the result multiplied with Cp to obtain a parameter and the two curves are approximated as the single curve as shown in FIG. 6. Further, in FIG. 6, by finding the coordinates $(dCp/\lambda)1$ and $(dCp/\lambda)2$ of the intersections of the horizontal lines drawn from Tsm1 and Tsm2 and this curve, multiplying these values with $\lambda 1$ ($\lambda 2$), and dividing by Cp1 (Cp2), the thicknesses d1 and d2 sticking to the rolls can be calculated.

If approximating the curve of FIG. 6 by a straight line, it is expressed by $T=A-B (Cpx/\lambda)$. When $x=0$, $T=Td=\Phi \cdot Ti=A$, so $T=\Phi \cdot Ti-B (Cpx/\lambda)$. Therefore, to prevent roll sticking, $\Phi \cdot Ti-B (Cpx/\lambda) \leq Tsm$, therefore, $x \geq \lambda/(Cp \cdot B)(\Phi \cdot Ti-Tsm)$. Right now the problem is the conditions under which the low melting point side film will not stick to the roll, so $d2 \geq \lambda 2/(Cp2 \cdot B)(\Phi \cdot Ti-Tsm2)$.

The time t is the contact time, so $t=L/V$ (V is the sheet running speed, and L is the contact length). If considering the fact that the inclination B is inversely proportional to the contact time (when the contact time becomes longer, the temperature becomes even), $B=\alpha (V/L)$. Therefore, $d2 \geq \lambda 2 \cdot L/(Cp2 \cdot \alpha \cdot V) (\Phi \cdot Ti-Tsm2)$. If $\lambda 2 \cdot L/(Cp2 \cdot \alpha)=k$, then $d2 \geq k (\Phi \cdot Ti-Tsm2)/V$.

Figure 7:
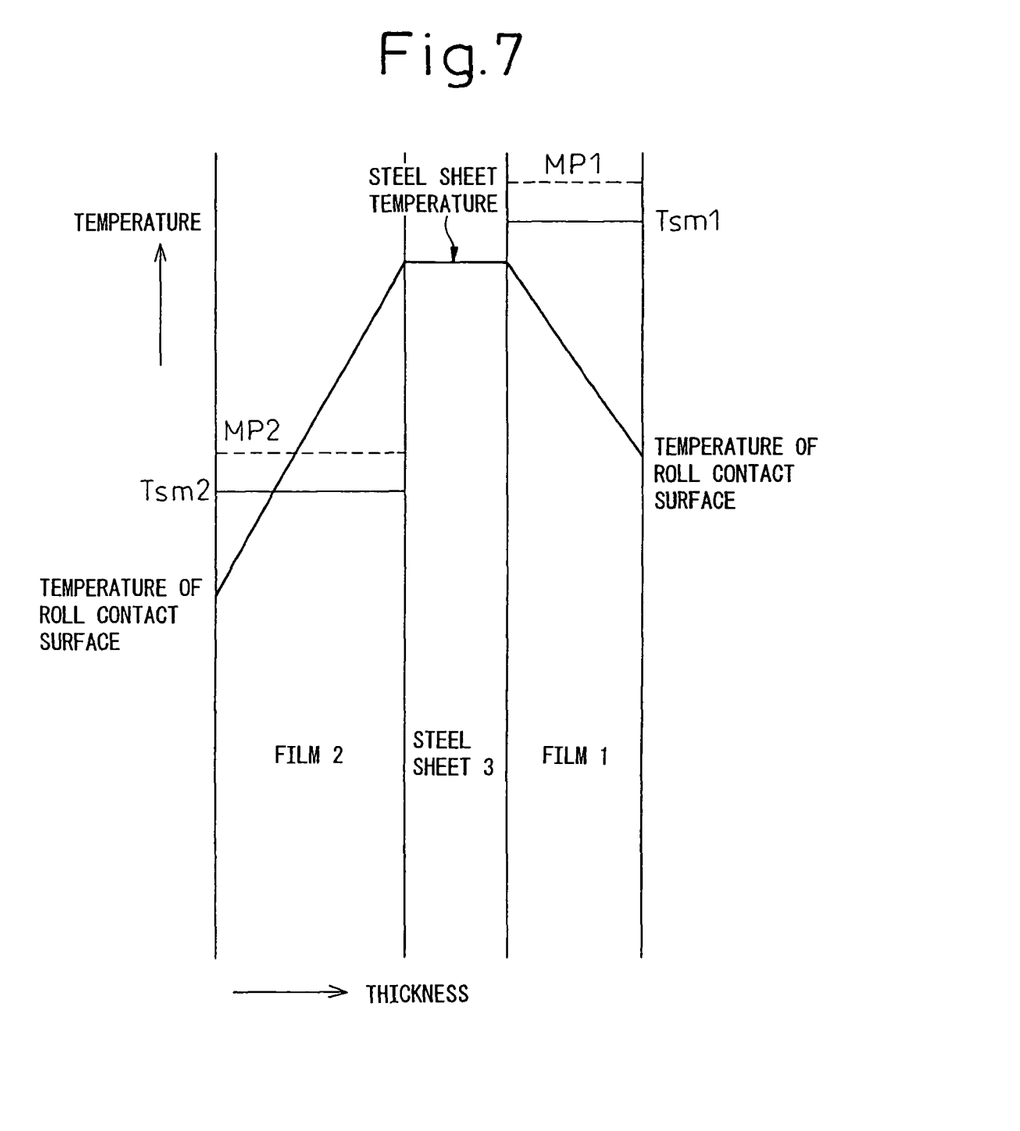
FIG. 7 is a view of the temperature profiles at the lamination roll exit side in the present invention.

This $d2 \geq k (\Phi \cdot Ti-Tsm2)/V$ is substantially equivalent to $d2 \geq k (\Delta MP-\Delta T')/V$ from the relationships $Tsm1-Tsm2 \approx MP1-MP2=\Delta MP$ and $\Delta T'=Tsm1-\Phi \cdot Ti$. Since $\Delta T=MP1-\Phi \cdot Ti \geq \Delta T'$, $d2 \geq k (\Delta MP-\Delta T')/V \geq k (\Delta MP-\Delta T)/V$. As shown in FIG. 7, this expresses the conditions for maintaining the temperature of the low melting point side film 2 at the side contacting the lamination roll 10 at less than the melting point of the film 2. Note that in FIG. 3, a simplified temperature gradient is shown, but the time during which the films 1 and 2 pass the lamination rolls 10, 10 is a short time of several tens of msec. Nonconstant heat movement occurs, so accurate analysis of the actual heat movement phenomenon is extremely difficult. Further, the pressing forces of the rolls, the surface conditions of the films, etc. cause the state of contact of the metal sheet and films and the films and roll to change. Due to this, the films also change in surface temperatures, so the temperature gradient also changes. Therefore, when finding the range of the value of k based on the Law of Heat Conduction operatively, it was learned that the range was $k \geq 2$. The larger the value of k, the greater the effect of suppression of film sticking, but actually 5 or so is sufficient.

Here, the method of finding d2 will be explained again.
1) Two types of film are selected.
2) The low melting point side MP2, $\lambda 2$, and Cp2 are investigated.
3) The high melting point side MP1 and $\lambda 1$ are investigated.
(If there are results of normal operation, $\lambda 1$ and Cp may be unknown)
4) The value of Ti and the conditions of $\Phi$ are found from MP1.
Normally, when $MP1-\Phi \cdot Ti=\Delta T$, $\Delta T \leq 50°$ C.
5) d2 is found from $d2 \geq k(\Delta MP-\Delta T)/V$.

In this case, the minimum value of d2 is when $k=2$. This value is determined with reference to $\lambda 2$ and Cp2 of the low melting point film 2 and the operating conditions. Note that the value of d1 is determined by the corrosion resistance and other functions.

Further, according to the above formula, if making the sheet running speed V greater, the films can be made thinner in thickness d2, but for the runnability of the films or the uniform heating of the metal sheet, it is not preferable that the sheet running speed V be made that high. Normally, the operation is performed at 2.5 to 3.5 m/s or so. However, depending on the facility, it is of course possible to make the value one over 3.5 m/s. As the metal sheet, various types of metal generally used as container materials such as aluminum sheet, soft steel sheet, various types of plated steel sheet, stainless steel sheet, etc. may be used.

The resin forming the high melting point film 1 may in principle be any thermoplastic resin. Ones selected from polyethylene terephthalate, polyethylene terephthalate/isophthalate copolymer, polyethylene naphthalate, polyethylene terephthalate/naphthalate copolymer, a mixed resin of polybutylene terephthalate and polyethylene terephthalate, a mixed resin of polybutylene terephthalate and a polyethylene terephthalate/isophthalate copolymer, or these resins including a pigment or dye are frequently used. Normally, for increasing the strength or hardness, a biaxially stretched film is used.

Further, for the purpose of increasing the bondability, it is also possible to give the metal sheet surface a chromate coating, give the surface of the resin contacting the steel sheet an adhesive layer having polarity, etc. in combination.

On the other hand, the resin forming the low melting point film 2 may in principle be any thermoplastic resin. Resins selected from polypropylene, polyethylene, a polypropylene/polyethylene random copolymer, or these resins including a pigment or dye are frequently used. These polyolefin-based resins are lower in melting point compared with the polyester-based resin forming the high melting point film 1. For example, the polyethylene terephthalate resin used as the high melting point film 1 has a melting point of 265° C., while the polypropylene resin used as the low melting point film 2 has a melting point of 168° C.

In the above way, the two-sided laminated metal sheet of the present invention is one in which the low melting point film 2 is adjusted in thickness to become thicker and is simultaneously laminated under relatively high temperature conditions matching the temperature conditions of the metal sheet 3 with the high melting point film 1. As a result, the laminated low melting point film 2 is heated to a considerably higher temperature than the conventional two-sided laminated metal sheet and becomes amorphous.

Figure 8:
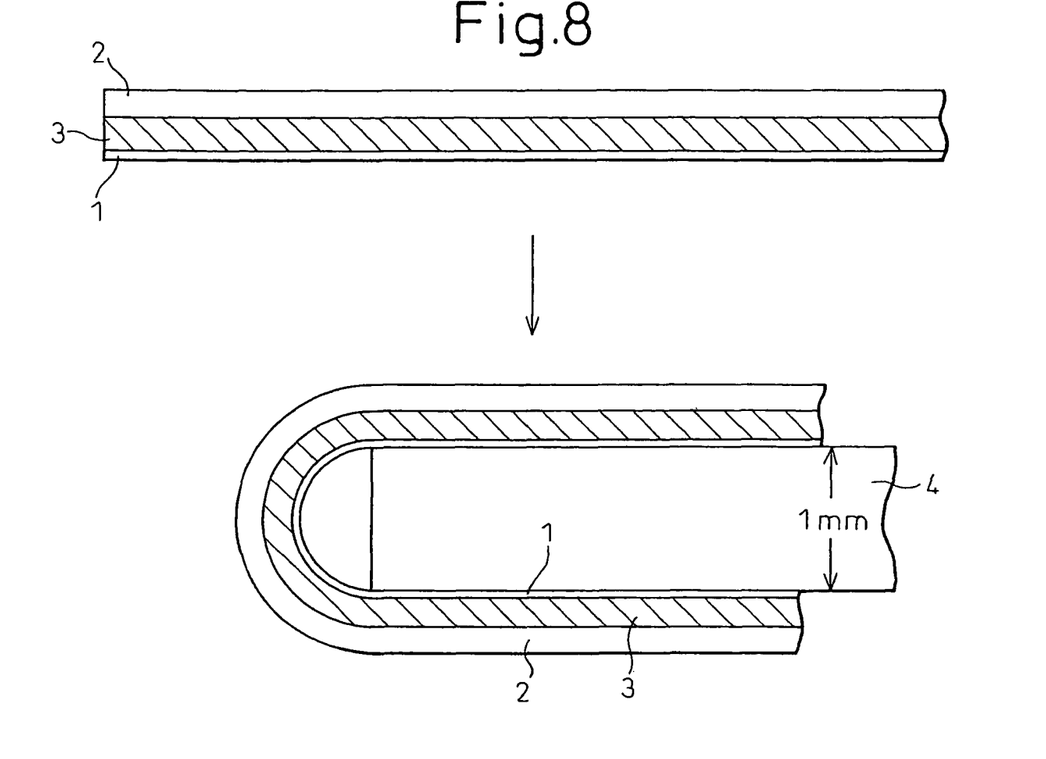
FIG. 8 is an explanatory view of bending by 180 degrees.

For this reason, the two-sided laminated metal sheet of the present invention becomes resistant to whitening even when bending for working it into a container etc. Clarifying this point by numerical values, in the present invention, as shown in FIG. 8, a sheet 4 having a thickness of 1 mm is bent 180 degrees to the outside across the high melting point film 1 side. The whitenesses of the low melting point film 2 before and after this are defined by the haze values. That is, the bending work is 180 degree bending so that the low melting point film 2 becomes the outside.

The haze value is the value defined as the diffusion transmittance/total light transmittance×100(%) when optically measuring the haze value of the film. The measurement method is prescribed in JIS-K7136. Here, the two-sided laminated metal sheet before bending and after bending is immersed in 40° C. 18% HCl to make the metal sheet 3 dissolve, the low melting point film 2 is peeled off, then a 50 mm×50 mm sample for measurement of the haze is taken so that the bent part becomes the center, the measurement is performed three times, and the average value is taken. The measurement is performed centered at the bent part.

The two-sided laminated metal sheet of the present invention has a difference $\Delta Hz = Hz2 - Hz1$ of not more than 20% when the haze value of the low melting point film 2 before bending is $Hz1$ and the haze value after bending is $Hz2$. Further, the haze value $Hz1$ of the low melting point film 2 before bending is preferably not more than 60%. By making this difference of the haze value $\Delta Hz$ before and after bending not more than 20%, even when performing bending work etc. in the food can production process, the low melting point film 2 is free from whitening and the can no longer appears to contain foreign matter.

Note that the whitening at the time of the bending work is accompanied with the formation of microcracks, but if $\Delta Hz$ is made not more than 20% as shown in the following examples, this problem can be avoided. Further, if the haze value $Hz1$ of the low melting point film 2 before bending is over 60%, the inner surface of the can whitens in appearance, so this is not preferable.

In the above way, the two-sided laminated metal sheet of the present invention has a difference $\Delta Hz$ of the haze values of the low melting point film 2 before and after bending of not more than 20% and can be produced by the low production cost simultaneous lamination method. Further, the temperature conditions of the metal sheet 3 can be set matching with the characteristics of the high melting point film 1, so it is possible to use for the high melting point film a biaxially stretched polyester-based resin film and laminate it in the state with that surface layer having residual crystal orientation.

Figure 9:
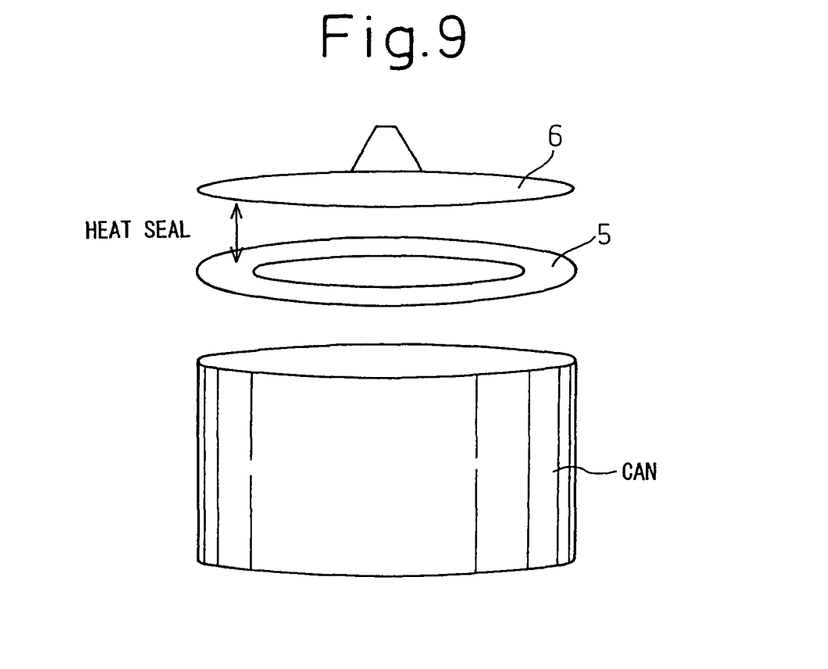
FIG. 9 is a perspective view of an easy peel EOE.

Note that when working the two-sided laminated metal sheet of the present invention into a container body, the high melting point film 1 is usually made the outside and the low melting point film 2 the inside. However, when using as the easy peel EOE (easy open end) shown in FIG. 9 or other can inside lid 5 the two-sided laminated metal sheet of the present invention, to raise the heat sealability with the outer lid 6 laminated with polypropylene at its bottom surface, sometimes the low melting point film 2 is used as the top side (can outer surface side). In this way, which side to make the outside of the container may be suitably determined in accordance with the application.

Example 1

The various types of film 1 (melting point MP1, thickness d1) and the various types of film 2 (melting point MP2, thickness d2) shown in Table 1 were laminated under the lamination conditions shown in Table 1 on the two sides of chrome plated steel sheets. Invention Examples 1 to 8 all had thicknesses d2 of the films 2 larger than the values of d2 calculated from the lamination conditions. The roll sticking of the films 2 of the invention examples and the bondability of the films 1 to the steel sheet were evaluated. The results are shown in Table 2. Further, examples outside the conditions of the present invention are similarly shown as Comparative Examples 1 to 5 in Table 1 and Table 2.

Note that, in Table 1, PP shows polypropylene film, but pure PP is nonpolar and cannot sufficiently be bonded by heat lamination, so one giving the metal bonding surface side a modified PP adhesive layer (melting point 166° C.) having a thickness of 4 µm and polarity is used. Further, the polyethylene film shown as PE is also nonpolar and cannot be sufficiently bonded by heat lamination in the pure state, so one giving the metal bonding surface side an ethylene acrylate copolymer resin adhesive layer (melting point 99° C.) of a thickness of 10 µm is used.

TABLE 1

| No. | | Film 1 | MP1 °C. | d1 µm | Film 2 | MP2 °C. | d2 µm | V m/s | Ti °C. | Φ | ΦTi °C. | k | d2 calculated value µm |
|---|---|---|---|---|---|---|---|---|---|---|---|---|---|
| 1 | Inv. Ex. 1 | PET-IA*5 | 226 | 20 | PP*7 | 168 | 40 | 2.5 | 233 | 0.858 | 200 | 2 | 25.5 |
| 2 | Inv. Ex. 2 | PET-IA*5 | 226 | 20 | PP*7 | 168 | 25 | 2.9 | 233 | 0.858 | 200 | 2 | 22.0 |
| 3 | Inv. Ex. 3 | PET-IA*5 | 226 | 20 | PE*8 | 112 | 80 | 2.5 | 257 | 0.778 | 200 | 2 | 70.4 |
| 4 | Inv. Ex. 4 | PET*6 | 265 | 13 | PP*7 | 168 | 70 | 2.5 | 285 | 0.842 | 240 | 2 | 57.6 |
| 5 | Inv. Ex. 5 | PET-IA*5 | 226 | 13 | PP*7 | 168 | 85 | 2.5 | 226 | 0.931 | 210 | 5 | 84.8 |
| 6 | Inv. Ex. 6 | PP*7 | 168 | 20 | EAA* | 99 | 65 | 1 | 173 | 0.751 | 130 | 2 | 61.8 |
| 7 | Inv. Ex. 7 | PET*6 | 265 | 20 | PP*7 | 168 | 40 | 3.5 | 271 | 0.849 | 230 | 2 | 35.5 |
| 8 | Inv. Ex. 8 | 2-layer PET | 226 | 13 | PP*7 | 168 | 30 | 2.5 | 234 | 0.855 | 200 | 2 | 25.7 |
| 9 | Comp. Ex. 1 | PET-IA*5 | 226 | 20 | PP*7 | 168 | 25 | 2.5 | 233 | 0.858 | 200 | 2 | 25.5 |
| 10 | Comp. Ex. 2 | PET-IA*5 | 226 | 20 | PP*7 | 168 | 20 | 2.5 | 203 | 0.862 | 175 | 2 | 5.6 |
| 11 | Comp. Ex. 3 | PET-IA*5 | 226 | 20 | PP*7 | 168 | 20 | 2.5 | 245 | 0.922 | 226 | 2 | 46.3 |
| 12 | Comp. Ex. 4 | PET-IA*5 | 226 | 20 | PE*8 | 112 | 60 | 2.5 | 257 | 0.778 | 200 | 2 | 70.4 |
| 13 | Comp. Ex. 5 | PET*6 | 265 | 13 | PP*7 | 168 | 40 | 2.5 | 285 | 0.842 | 240 | 2 | 57.6 |

*EAA: ethylene acrylate copolymer

TABLE 2

| No. | | Film 2 roll sticking | Film 1 bondability | Remarks |
|---|---|---|---|---|
| 1 | Inv. Ex. 1 | OK | OK | Plenty of leeway |
| 2 | Inv. Ex. 2 | OK | OK | Increase of speed avoids sticking to lamination roll |
| 3 | Inv. Ex. 3 | OK | OK | Change of type of film |
| 4 | Inv. Ex. 4 | OK | OK | Change of type of film |
| 5 | Inv. Ex. 5 | OK | OK | k practical upper limit |
| 6 | Inv. Ex. 6 | OK | OK | V = 1.0 m/s |
| 7 | Inv. Ex. 7 | OK | OK | V = 3.5 m/s |
| 8 | Inv. Ex. 8 | OK | OK | 2-layer structure |
| 9 | Comp. Ex. 1 | NG | OK | Film sticking limit |
| 10 | Comp. Ex. 2 | OK | NG | High temperature side bonding limit |
| 11 | Comp. Ex. 3 | NG | OK | ΦTi = MP1 |
| 12 | Comp. Ex. 4 | NG | OK | Change of type of film |
| 13 | Comp. Ex. 5 | NG | OK | Change of type of film |

According to Invention Example 1, even when performing retort processing in steam at 125° C.×30 minutes, a good bondability free from film peeling is obtained. Comparative Example 1 is an example in which the other conditions are made the same as in Invention Example 1, but the thickness of the film 2 is made 25 µm or smaller than the 25.5 µm of the calculated value of d2 and sticking to the lamination roll occurred. Therefore, an example in which the other conditions are made the same, but the sheet running speed of Comparative Example 1 is raised to 2.9 m/s is Invention Example 2. Due to this, the calculated value of d2 becomes 22 µm or less than the 25 µm of the thickness of the film 2. As a result, sticking to the lamination roll can be avoided.

Comparative Example 2 is an example of lowering Ti to Td=ΦTi=175° C. and as a result making ΔT=MP1−ΦTi 51° C. In this case, bonding is no longer possible. Further, Comparative Example 3 is an example in which ΦTi is raised to 226° C. or equal to the melting point MP1 of the film 1. The film 2 stuck to the lamination roll.

Invention Example 3 is an example of changing the type of the film 2 from Invention Example 1 to PE. A laminated metal sheet was produced without allowing sticking to the lamination rolls. Comparative Example 4 is an example in which the conditions were made the same as in Invention Example 3 and the thickness of the film 2 was made 60 µm or thinner than the 70.4 µm of the calculated value of d2. Sticking of the film 2 to the lamination roll occurred.

Comparative Example 5 is also an example in which the thickness of the film 2 was made 40 µm or thinner than the calculated value of d2. Sticking of the film 2 to the lamination roll occurred. Therefore, in Invention Example 4, the other conditions were made the same as those of Comparative Example 5 and the thickness of the film 2 was made 70 µm. As a result, the film no longer stuck to the lamination roll. Even if retort sterilizing the obtained laminated metal sheet, the film 1 did not peel.

Invention Example 5 is an example where the thickness of the film 2 is matched with the calculated value of d2. This is an example where the thickness of the low melting point film is close to the upper limit. If calculating the k value of this case utilizing the 85 µm thickness of the low density polyethylene film, about k=5. This extent of k value is believed to be the actual upper limit.

Invention Example 6 is an example where even if the sheet running speed was made the lower limit of 1 m/s, lamination was possible without trouble. Further, Invention Example 7 is an example in which even if the sheet running speed is made the 3.5 m/s upper limit value of the facility, lamination was possible without trouble. Invention Example 8 is an example of use of a two-layer PET film as the film 1. This two-layer PET film is comprised of an outside of PET of a thickness of 7 µm and a melting point of 265° C. and an inside of PET-IA (*5) of a thickness of 6 µm and a melting point of 226° C.

In the above invention examples and comparative examples, as the metal sheet, chrome plated steel sheet was used, but unplated steel sheet, aluminum sheet, copper sheet, etc. treated on their surfaces as need give similar results as confirmed from experiments.

Note that *1 to *8 in the evaluation column of Table 1 show the following content.

*1: Ia/Ib is the ratio of the following two peaks obtained by X-ray diffraction measurement using CuKα-rays at a two-sided laminated metal sheet at the high melting point film (polyester film) covered side. Ia is the X-ray diffraction intensity of the diffraction face of the (100) face parallel to the surface of the polyester film (distance between faces about 0.34 nm), while Ib is similarly the X-ray diffraction intensity by the diffraction face of the (110) face (distance between faces about 0.39 nm). In the examples, Ia/Ib is 0.7 to 10 in range and shows that the crystal orientation remains without complete melting up to the surface layer.

*2: The corrosion resistance after working is the result from punching a two-sided laminated metal sheet into a disk shape of a diameter of 158 mm, drawing it by a draw ratio of 1.56 so that the low melting point film becomes the inner surface to obtain a shallow drawn cup, then redrawing it by a draw ratio of 1.23 to obtain a can of a cup diameter of 82 mm and a cup height of 52 mm (DRD can), filling the inside with 2% citric acid, then storing it at 37 degrees for six months and examining the inside surface of the can for the state of corrosion.

*3: PET-PBT is a mixed resin of polyethylene terephthalate and polybutylene terephthalate.

*4: Two-layer PET is two-layer structure film with a surface layer of 10 μm PET (MP 265° C.) and a bottom layer of 10 μm PET-IA (MP about 150° C.).

*5: PET-IA is polyethylene terephthalate/isophthalate copolymer.

*6: PET is polyethylene terephthalate.

*7: PP is polypropylene.

*8: PE is polyethylene.

Example 2

Table 3 shows examples of the present invention. The two types of films of the materials shown in the table were simultaneously laminated on the two sides of steel sheets. MP1 indicates the melting point of the high melting point film, d1 indicates its thickness, MP2 indicates the melting point of the low melting point film, and d2 indicates its thickness. The sheet temperature Ti indicates the metal sheet temperature at the time of lamination, while the speed v indicates the sheet running speed at the time of lamination. Hz1 and Hz2 were measured by the method explained above based on JIS-K7136. Further, Table 4 shows comparative examples.

TABLE 3

| | Can outer surface side | | | Can inside surface side | | | Sheet temperature | | Evaluation result | | | | | | |
|---|---|---|---|---|---|---|---|---|---|---|---|---|---|---|---|
| | Material of film | MP1 (° C.) | d1 (μm) | Material of film | MP2 (° C.) | d2 (μm) | Ti ° C. | Speed v m/s | Hz1 % | Hz2 % | ΔHz % | PET surface x-ray Ia/Ib*1 | Formability | Can inside surface whitening | Corrosion resistance after working*2 |
| Inv. Ex. 9 | PET-IA*5 | 226 | 20 | PP*7 | 168 | 30 | 225 | 3.5 | 28.9 | 32.8 | 3.9 | 2.6 | Good | Very good | No abnormality |
| Inv. Ex. 10 | PET-IA*5 | 226 | 20 | PP*7 | 168 | 25 | 233 | 2.9 | 29.5 | 38.9 | 9.4 | 1.5 | Good | Very good | No abnormality |
| Inv. Ex. 11 | PET-IA*5 | 226 | 20 | PP*7 | 168 | 30 | 226 | 2.9 | 27.6 | 43.5 | 15.9 | 4.6 | Good | Very good | No abnormality |
| Inv. Ex. 12 | PET-PBT*3 | 214 | 12 | PP*7 | 168 | 25 | 212 | 2.9 | 25.3 | 44.3 | 19 | 4.8 | Good | Good | No abnormality |
| Inv. Ex. 13 | PET*6 | 265 | 20 | PP*7 | 168 | 40 | 271 | 3.5 | 38.6 | 42.3 | 3.7 | 1.4 | Good | Very good | No abnormality |
| Inv. Ex. 14 | PET-IA*5 | 226 | 20 | PP*7 | 168 | 40 | 233 | 2.5 | 35.2 | 44.8 | 9.6 | 1.5 | Good | Very good | No abnormality |
| Inv. Ex. 15 | PET-IA*5 | 226 | 13 | PP*7 | 168 | 40 | 228 | 2.5 | 34.3 | 48.9 | 14.6 | 3.2 | Good | Very good | No abnormality |
| Inv. Ex. 16 | PET-PBT*3 | 214 | 12 | PP*7 | 168 | 40 | 216 | 2.5 | 32.6 | 50.2 | 17.6 | 3.9 | Good | Good | No abnormality |
| Inv. Ex. 17 | PET-IA*5 | 226 | 20 | PE*8 | 112 | 80 | 257 | 2.5 | 48.5 | 50.8 | 2.3 | 0.7 | Good | Very good | No abnormality |
| Inv. Ex. 18 | PET*6 | 265 | 13 | PP*7 | 168 | 70 | 285 | 2.5 | 46.2 | 55.9 | 9.7 | 1.2 | Good | Very good | No abnormality |
| Inv. Ex. 19 | PET-IA*5 | 226 | 13 | PE*8 | 112 | 80 | 242 | 2.5 | 46.8 | 61.6 | 14.8 | 2.9 | Good | Very good | No abnormality |
| Inv. Ex. 20 | PET-IA*5 | 226 | 13 | PP*7 | 168 | 85 | 226 | 2.5 | 47.5 | 67.2 | 19.7 | 4.5 | Good | Good | No abnormality |
| Inv. Ex. 21 | 2-layer PET*4 | to 150 | 20 | PP*7 | 168 | 20 | 207 | 2.5 | 19.7 | 24.9 | 5.2 | 8.9 | Good | Very good | No abnormality |
| Inv. Ex. 22 | 2-layer PET*4 | to 150 | 20 | PP*7 | 168 | 20 | 195 | 2.5 | 17.6 | 27.6 | 10 | 9.2 | Good | Very good | No abnormality |
| Inv. Ex. 23 | 2-layer PET*4 | to 150 | 20 | PP*7 | 168 | 20 | 183 | 2.5 | 15.8 | 31.6 | 15.8 | 9.6 | Good | Very good | No abnormality |
| Inv. Ex. 24 | 2-layer PET*4 | to 150 | 20 | PP*7 | 168 | 20 | 172 | 2.5 | 14.6 | 34.3 | 19.7 | 10 | Good | Good | No abnormality |
| Inv. Ex. 25 | 2-layer PET*4 | to 150 | 20 | PP*7 | 168 | 15 | 188 | 2.5 | 9.9 | 16.3 | 6.4 | 9.4 | Good | Very good | No abnormality |
| Inv. Ex. 26 | 2-layer PET*4 | to 150 | 20 | PP*7 | 168 | 15 | 178 | 2.5 | 8.8 | 20.1 | 11.3 | 9.8 | Good | Good | No abnormality |
| Inv. Ex. 27 | 2-layer PET*4 | to 150 | 20 | PP*7 | 168 | 15 | 168 | 2.5 | 6.9 | 25.9 | 19 | 12.5 | Good | Good | No abnormality |
| Inv. Ex. 28 | PET*6 | 265 | 13 | PP*7 | 168 | 90 | 285 | 2.5 | 58.7 | 66.8 | 8.1 | 1.6 | Good | Very good | No abnormality |
| Inv. Ex. 29 | PET*6 | 265 | 13 | PP*7 | 168 | 80 | 287 | 2.5 | 52.1 | 57.3 | 5.2 | 1.4 | Good | Very good | No abnormality |
| Inv. Ex. 30 | PET-IA*5 | 226 | 20 | PE*8 | 112 | 90 | 247 | 2.5 | 59.2 | 73.2 | 14 | 2.3 | Good | Good | No abnormality |

TABLE 4

| | Can outer surface side | | | Can inside surface side | | | Sheet temperature | | Evaluation result | | | | | | |
|---|---|---|---|---|---|---|---|---|---|---|---|---|---|---|---|
| | Material of film | MP1 (° C.) | d1 (μm) | Material of film | MP2 (° C.) | d2 (μm) | Ti ° C. | Speed v m/s | Hz1 % | Hz2 % | ΔHz % | PET surface X-ray Ia/Ib*1 | Formability | Can inside surface whitening | Corrosion resistance after working*2 |
| Comp. Ex. 6 | PET-PBT*3 | 214 | 12 | PP*7 | 168 | 30 | 206 | 2.9 | 25.1 | 53.8 | 28.7 | 4.8 | Poor | Poor | Medium corrosion |
| Comp. Ex. 7 | PET-PBT*3 | 214 | 12 | PP*7 | 168 | 35 | 206 | 2.9 | 28.6 | 60.6 | 32 | 4.9 | Poor | Poor | Medium corrosion |
| Comp. Ex. 8 | PET-PBT*3 | 214 | 12 | PP*7 | 168 | 50 | 216 | 2.5 | 33.5 | 63.8 | 30.3 | 4.2 | Poor | Poor | Small corrosion |

TABLE 4-continued

| | Can outer surface side | | | Can inside surface side | | | Sheet temperature Ti °C. | Speed v m/s | Evaluation result | | | | | | |
|---|---|---|---|---|---|---|---|---|---|---|---|---|---|---|---|
| | | | | | | | | | | | | PET surface | | Can inside | Corrosion resistance |
| | Material of film | MP1 (°C.) | d1 (μm) | Material of film | MP2 (°C.) | d2 (μm) | | | Hz1 % | Hz2 % | ΔHz % | X-ray Ia/Ib*1 | Formability | surface whitening | after working*2 |
| Comp. Ex. 9 | PET-PBT*3 | 214 | 12 | PP*7 | 168 | 40 | 206 | 2.5 | 31.2 | 55.3 | 24.1 | 5.2 | Poor | Poor | Small corrosion |
| Comp. Ex. 10 | PET-IA*5 | 226 | 13 | PP*7 | 168 | 90 | 226 | 2.5 | 49.8 | 72.3 | 22.5 | 4.8 | Poor | Poor | Small corrosion |
| Comp. Ex. 11 | PET-IA*5 | 226 | 13 | PE*8 | 112 | 80 | 226 | 2.5 | 43.6 | 68.7 | 25.1 | 4.3 | Poor | Poor | Small corrosion |
| Comp. Ex. 12 | 2-layer PET*4 | to 150 | 20 | PP*7 | 168 | 25 | 172 | 2.5 | 14.4 | 39.8 | 25.4 | 10.8 | Poor | Poor | Large corrosion |
| Comp. Ex. 13 | 2-layer PET*4 | to 150 | 20 | PP*7 | 168 | 20 | 150 | 2.5 | 13.8 | 49.6 | 35.8 | 12.5 | Poor | Poor | Large corrosion |
| Comp. Ex. 14 | 2-layer PET*4 | to 150 | 20 | PP*7 | 168 | 15 | 150 | 2.5 | 6.2 | 38.9 | 32.7 | 12.3 | Poor | Poor | Large corrosion |
| Comp. Ex. 15 | PET-IA*5 | 226 | 13 | PE*8 | 112 | 90 | 228 | 2.5 | 57.3 | 78.6 | 21.3 | 3.1 | Poor | Poor | Small corrosion |

In these tables, "Good" in the formability column shows that no film damage could be recognized when performing the work of the later *2, while "Poor" indicates that cracks accompanied with whitening were observed. "Very good" in the can inside surface whitening column indicates no whitening at all, "Good" indicates slight whitening of a substantially harmless extent, and "Poor" indicates that clear whitening was observed. Note that *1 to *8 in the evaluation columns of Table 3 and Table 4 indicate the same content as in Example 1.

*1: Ia/Ib is the ratio of the following two peaks obtained by X-ray diffraction measurement using CuKα-rays at a two-sided laminated metal sheet at the high melting point film (polyester film) covered side. Ia is the X-ray diffraction intensity by the diffraction face of the (100) face parallel to the surface of the polyester film (distance between faces about 0.34 nm), while Ib is similarly the X-ray diffraction intensity by the diffraction face of the (110) face (distance between faces about 0.39 nm). In the examples, Ia/Ib is 0.7 to 10 in range and shows that the crystal orientation remains without complete melting up to the surface layer.

*2: The corrosion resistance after working is the result from punching a two-sided laminated metal sheet into a disk shape of a diameter of 158 mm, drawing it by a draw ratio of 1.56 so that the low melting point film becomes the inner surface to obtain a shallow drawn cup, then redrawing it by a draw ratio of 1.23 to obtain a can of a cup diameter of 82 mm and a cup height of 52 mm (DRD can), filling the inside with 2% citric acid, then storing it at 37 degrees for six months and examining the inside surface of the can for the state of corrosion.

*3: PET-PBT is a mixed resin of polyethylene terephthalate and polybutylene terephthalate.

*4: Two-layer PET is two-layer structure film with a surface layer of 10 μm PET (MP 265° C.) and a bottom layer of 10 μmPET-IA (MP about 150° C.).

*5: PET-IA is polyethylene terephthalate/isophthalate copolymer.

*6: PET is polyethylene terephthalate.

*7: PP is polypropylene.

*8: PE is polyethylene.

As clear from Table 3 and Table 4, the two-sided laminated metal sheets of the present invention where the difference ΔHz of the haze values of the low melting point film before and after bending is made 20% or less are superior in formability and corrosion resistance after working and are completely free of or exhibit almost no whitening when worked into a can or other container. As opposed to this, in the comparative examples where the difference ΔHz of the haze values before and after bending is over 20%, whitening is observed when worked into a container and the formability and corrosion resistance after working are also inferior, it is learned.

INDUSTRIAL APPLICABILITY

In the laminated metal sheet according to the present invention, it is possible to adjust the thickness of the low melting point side film so as to simultaneously laminate two types of films with different melting points on the two sides of a metal sheet without sticking to the lamination rolls.

Further, even when bending the sheet to produce a food can etc., there is no whitening of the low melting point resin film and the inside of the can no longer appears to contain foreign matter. Further, if using for the high melting point film a biaxially stretched polyester-based resin film and leaving crystal orientation at that surface layer, the high melting point film can be given sufficient hardness or strength and the film thickness can be made thinner and the cost further reduced.

For this reason, there is the advantage that existing lamination apparatuses can be used as they are.

The invention claimed is:

1. A method for producing a laminated metal sheet comprising a metal sheet and a high melting point film having a melting point MP1 and a low melting point film having a melting point MP2 on opposite sides of said metal sheet, wherein MP1 is substantially higher than MP2, the method comprising the steps of:

heating the metal sheet to a temperature Ti at lamination roll inlet side, wherein Ti is MP 1+(50° C. or less); and laminating the high melting point film and the low melting point film on the metal sheet by passing the metal sheet, the high melting point film and the low melting point film through a pair of lamination rolls at a sheet running speed V;

low melting point film is made to a thickness d2 defined by the following equation (1):

$$d2(\mu m) \geq k(\Delta MP - \Delta T)/V \tag{1}$$

where, $\Delta MP = MP1 - MP2$, wherein $\Delta MP$ is 46° C. or higher
MP 1: melting point of high melting point film (° C.)
MP2: melting point of low melting point film (° C.)
k: constant determined by said low melting point film's heat conductivity, heat capacity, and temperature, wherein $k \geq 2[\mu m \cdot m/(° C. \cdot s)]$ $$0 < \Delta T = MP1 - \phi \cdot Ti \leq 50 (° C.)$$

Ti: metal sheet temperature at lamination roll inlet side (° C.)
φ: constant determined by heat removal conditions at time of lamination wherein $0.75 \leq \phi < 1$
V: sheet running speed (m/s).

2. A method for producing a laminated metal sheet as set forth in claim 1, characterized in that the sheet running speed V defined in equation (1) is made 1 to 3.5 m/s for lamination.

3. A method for producing a laminated metal sheet as set forth in claim 1, wherein the high melting point film is comprised of a polyester-based resin and the low melting point film is comprised of a polyolefin-based resin.

* * * * *

UNITED STATES PATENT AND TRADEMARK OFFICE
CERTIFICATE OF CORRECTION

PATENT NO.         : 8,551,281 B2
APPLICATION NO.    : 12/317201
DATED              : October 8, 2013
INVENTOR(S)        : Hayato Kazeoka et al.

It is certified that error appears in the above-identified patent and that said Letters Patent is hereby corrected as shown below:

In the Specification

Column 2, line 57, change "point Film's" to -- point film's --;

In the Claims

Column 13, line 59, change "10μmPET-IA" to -- 10μm PET-IA --.

Signed and Sealed this
Twenty-fifth Day of November, 2014

Michelle K. Lee
*Deputy Director of the United States Patent and Trademark Office*